FULL OPEN END

Original Filed March 13, 1968 2 Sheets-Sheet 1

INVENTORS
LEONARD THOMAS LA CROCE
RAYMOND LUSCOMBE BATCHELAR
JOHN WILSON ROUSE
BY John E. Wilson
ATTORNEY FULL OPEN END
Original Filed March 13, 1968 2 Sheets-Sheet 2
Fig. 4
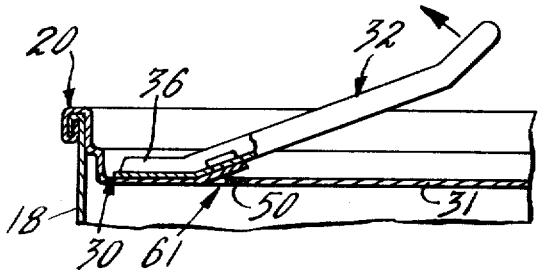
Fig. 5
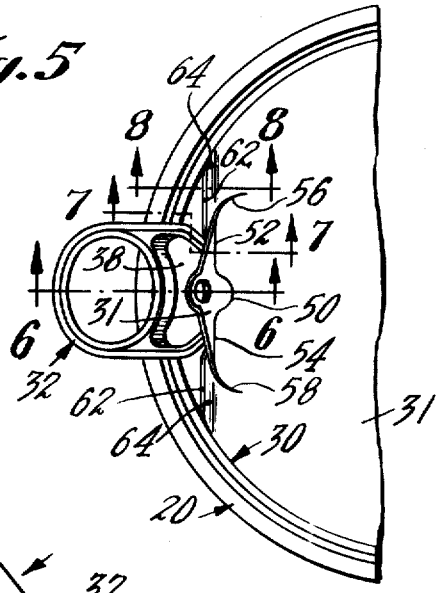
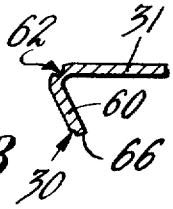
Fig. 8
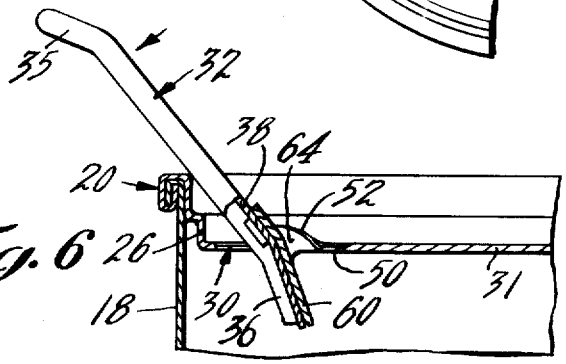
Fig. 6
Fig. 7
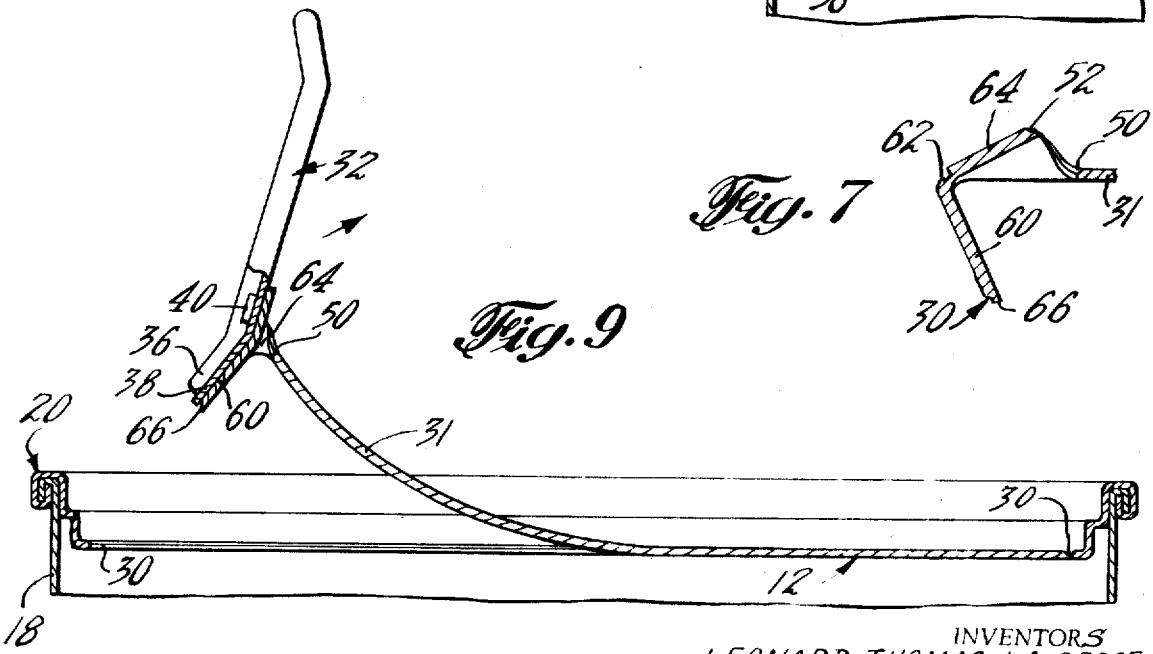
Fig. 9
INVENTORS
LEONARD THOMAS LA CROCE
RAYMOND LUSCOMBE BATCHELAR
JOHN WILSON ROUSE
BY John E. Wilson
ATTORNEY United States Patent Office Re. 27,897
Reissued Jan. 22, 1974

27,897
FULL OPEN END

Leonard Thomas La Croce, Paramus, and Raymond Luscombe Batchelar, Westwood, N.J., and John Wilson Rouse, Stamford, Conn., assignors to American Can Company, New York, N.Y.

Original No. 3,544,025, dated Dec. 1, 1970, Ser. No. 728,518, May 13, 1968. Application for reissue Aug. 5, 1971, Ser. No. 169,559
Int. Cl. B65d *17/20*
U.S. Cl. 220—54 17 Claims

Matter enclosed in heavy brackets [ ] appears in the original patent but forms no part of this reissue specification; matter printed in italics indicates the additions made by reissue.

ABSTRACT OF THE DISCLOSURE

A "self-opening" can end having a central wall is peripherally scored to define a removable panel which may be removed by manipulation of a pull tab which is riveted to the removable panel at a location adjacent to the peripheral score, the removable panel being provided with to ancillary score passing adjacent to the rivet on the side thereof away from the peripheral score, to set off in the removable panel a pivotable portion which contains the rivet and two flex-inducing scores which are disposed on either side of the rivet between the peripheral score and the ancillary score, to render the pivotable portion sufficiently flexible to prevent its rupture during the opening operation. The outer end of the pull tab is tilted upwardly to insure that the ancillary score ruptures before the peripheral score does.

BACKGROUND OF THE INVENTION

*This application is a reissue of Ser. No. 728,518, filed May 13, 1968, Pat. No. 3,544,025.*

One form of "self-opening" can which is coming into wide use is the "full-open" can in which a peripheral score, generally circular in configuration, is formed in the end panel at or adjacent to the periphery thereof to permit its complete removal. Full-open cans are to be distinguished from those self-opening cans which have a comparatively small removable section which, when separated, provides a comparatively small hole for dispensing the product since the latter are only appropriate for packaging beer, other beverages and other liquids which are to be poured from the container.

Full-open cans, on the other hand, are suitable for packaging solid products which are customarily removed by inserting the hand or a spoon or measuring cup into the container, and for products which require a large opening if they are to be removed without mutilation. Candy, shelled nuts, meats, ground coffee, solid or chunky products such as processed and frozen vegetables, fruits, frozen fruit juices, sausages and other meat products are examples of products which are suitable for packaging in full-open cans.

In some full-open cans, the peripheral score is the outer score of a peripheral tear strip which is paralleled on its inner side over most of its length by another score. The tear strip usually has a more or less radially extending portion leading towards the center of the panel so that the tear strip is essentially spiral in configuration. A pull tab is secured to the radially extending portion, and when pulled upwardly, has the effect of tearing the scores on either side of that section until the tears spill out to the peripheral score and the score parallel to it. As the peripheral score is torn, the metal within it is detached from the can. This type of opening feature is somewhat objectionable, in that the circular tear strip is rather long in comparison to the diameter of the end so that the consumer must exert a long continuous pull on the opening tab if the peripheral score is to be completely ruptured to permit removal of the end panel.

In the present type of full-open can, the tear strip is omitted, and the opening tab is positioned close enough to the peripheral score so what when its inner end is rocked upwardly to cause its outer end to move downwardly and exert a downward force on the end panel at or near the peripheral score, a portion of the end panel is bent downwardly to initiate rupture of the peripheral score. Therefater, an upward and backward pull on the opening tab by the user induces tearing of the metal in the score on both sides of the area of initial rupture to effect the complete detachment from the can of the removable section which is defined by the peripheral score. This type of full-open can is advantageous because the consumer does not have to exert a pull for as long as is necessary to open a full-open can having a circular or spiral tear strip.

In the development of the present type of full-open can, several problems have appeared. One of these has been that when the internal pressure in the container differs appreciably from atmospheric pressure, the sudden rush of gas which occurs when the container is initally opened produces a loud implosive or explosive sound, if uncontrolled. The present invention solves this problem by providing for a controlled preventing of the container.

Another problem is that there is a tendency for the portion of the removable panel to which the opening tab is attached to tear away from the balance of the removable panel because of its rigidity. This has been overcome by providing suitable scores in the panel to induce controlled flexing in it during the opening operation to thereby decrease its rigidity to the degree necessary to eliminate its inadvertent rupture. As a result, the present invention provides a practical container construction which is easy to open and reliable in operation. Other advantages of the invention are set forth in detail in the instant specification.

SUMMARY OF THE INVENTION

It is an object of the present invention to provide a full-open can in which a pull tab is positioned close to the peripheral main score and in which the tab is riveted to a pivotable section of the removable panel, but in which inadvertent rupture of said pivotable section from the removable panel during the opening operation is prevented.

This and other objects are attained by providing a container with an end closure having a main circular score adjacent to the countersink wall and an ancillary chordal score formed within the main score, and defining a pivotable section having one or more flex inducing scores extending between the ancillary and main scores to prevent inadvertent tearing of said section from the remainder of the can end during the opening operation. The outer end of the pull tab is tilted upwardly so that the ancillary score tears before initial rupture of the peripheral score occurs, thus minimizing the opening pressure required and preventing the interior of the can to the atmosphere.

BRIEF DESCRIPTION OF THE DRAWINGS

FIG. 4 is an enlarged fragmentary section, similar to FIG. 3 and showing the position of parts after the pull tab has been rocked upwardly a sufficient distance to initiate rupture of the ancillary score;

FIG. 5 is a fragmentary plan view of the closure, taken on the scale of FIG. 1 and showing the position of the parts after the pull tab has been rocked a sufficient distance to initiate rupture of the peripheral score;

FIG. 6 is an enlarged fragmentary section taken substantially along the line 6—6 of FIG. 5;

FIG. 7 is a fragmentary sectional view, on an enlarged scale, taken substantially along the line 7—7 of FIG. 5;

FIG. 8 is a fragmentary sectional view on an enlarged scale, taken substantially along the line 8—8 of FIG. 5; and FIG. 9 is an enlarged view, similar to FIG. 3, and showing the position of parts during the time the pull tab is being pulled upwardly and backwardly in the general direction of the arrow to effect complete removal of the removable central panel of the end.

DESCRIPTION OF THE PREFERRED EMBODIMENT

Figure 1:
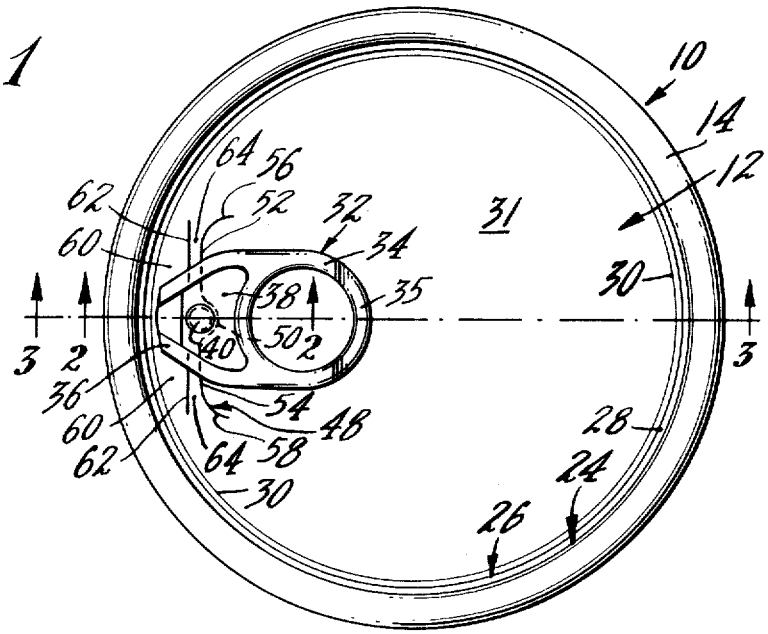
FIG. 1 is a plan view of an end closure made in accordance with the present invention.
Figure 2:
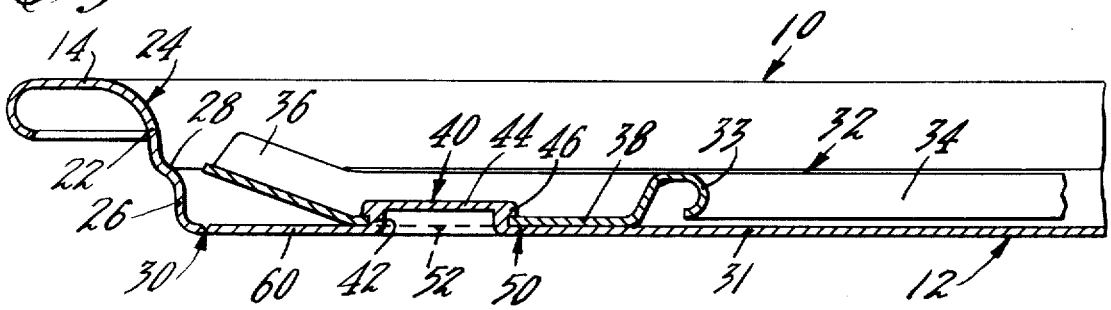
FIG. 2 is an enlarged fragmentary section, taken substantially along line 2—2 of FIG. 1.
Figure 3:
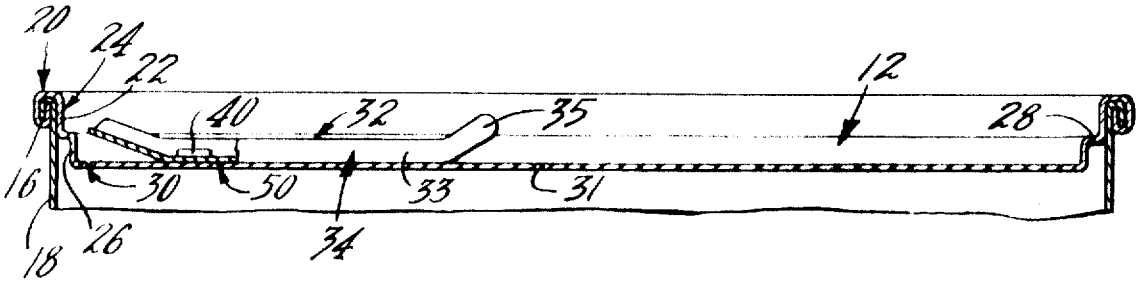
FIG. 3 is an enlarged section, taken along the line 3—3 in FIG. 1 and showing the end closure after it has been seamed onto a can body.

FIGS. 1 and 2 of the drawings illustrate a can end indicated generally as 10, and made in accordance with the instant invention. Preferably, it is circular and made of aluminum, tin-plate, or other rupturable material. The end closure 10 is formed with a substantially flat imperforate central wall 12 and has an edge curled peripheral flange 14 which is adapted to be interfolded with an end flange 16 of a can body 18 to form a double seam 20 as shown in FIG. 3. The bottom end of the can body 18 is closed in any suitable manner as by seaming a conventional end (not shown) thereto, or if desired, by an end wall (not shown) formed as an integral part of the body 18.

The central wall 12 and the peripheral flange 14 are preferably joined by a countersink wall 22 which has an upper portion 24 and an inwardly offset lower portion 26 which are joined by a shoulder portion 28. The general construction and advantages of the present countersink wall are covered by U.S. Pat. application, Ser. No. 624,-051, filed in the names of Leonard Thomas La Croce and Raymond Luscombe Batchelar, and do not form a part of the present invention.

At or adjacent to the periphery of the central wall 12 is a score 30 which is indented into the metal and defines a panel 31 of the can end which is removable, this panel 31 including most of the wall 12. Positioned close to the score 30 is a stiff, nonbendable opening tab 32 having a curled peripheral edge 33, and at its inner end, a handle portion 34 with an uplifted portion 35 to enable the pull tab to be easily grasped by the user. The opening tab 32 has at its outer end an uplifted nose portion 36, the purpose of which will appear presently, and a flat-web portion 38 which extends between the nose portion 36 and the handle portion 34. *As clearly seen in FIG. 2, the terminal surface of nose 36 is disposed substantially above flat-web portion 38, as well as being spaced substantially above panel 31.*

The pull tab 32 is joined to the removable panel 31 by a suitable securement, preferably by a rivet 40 which is formed integral with the removable panel 31, and extends through a rivet hole in the flat-web portion 38 of the pull tab 32. The rivet 40 (See FIG. 2) has an annular side wall 42 which merges at its top into a transverse wall 44 having about its periphery an annular bead 46 which extends over the flat-web portion 38 of the opening tab 34 to secure the opening tab 34 to the removable panel 31.

In the outer edge portion of the removable panel 31 is a generally chordally extending ancillary score 48 having a curved central portion 50 which passes immediately behind the rivet 40. The score 48 also includes straight segments 52 and 54 which extend outwardly from the curved portion 50 and diametrically of the rivet 40 and merge into inwardly curled terminal portions 56 and 58, respectively. The metal between the ancillary score 48 and the peripheral score 30 forms a pivotable section 60 which is provided on either side of the rivet 40 with a pair of spaced flex-inducing scores 62, which function to induce flexing in the section 60, as will hereinafter be explained.

Initial rupture of the ancillary score 48 occurs in its curved portions 50 during the first stage of the upward rock of the tab 32 as shown in FIG. 4. The upturned nose portion 36 of the tab 32 allows this initial rupture of the ancillary score to occur prior to the application of rupturing force to the peripheral score 30 by the tab 32, as clearly seen in FIG. 4. Since it requires a comparatively large force to initiate the rupture of a score, it is desirable that ruptures in the ancillary score 48 and the peripheral score 30 not be initiated simultaneously in order to limit the force which must be exerted on the pull tab 32 by the user.

Another advantage of such a construction is that initial rupture of the ancillary score 48 causes a controlled venting of the container through the small opening 61 (See FIG. 4) which is created by the rupture of the curved portion 50, thereby equalizing the internal pressure of the can and the atmospheric pressure on the top of the central panel 12.

If the tab nose 36 were not tilted upwardly, the upward rocking of the tab 32 would cause the peripheral score 30 to rupture prior to or virtually simultaneously with the rupture of the ancillary score 48. Were this to occur in cases where the internal pressure were less than the atmospheric pressure, as when the contents were vacuum packed, the pressure differential would cause the spontaneous rupture of the peripheral score 30 in both directions from its area of initial rupture (the area immediately below the tab nose 36) and the resultant rush of air into the vacuumized can through the large opening thus formed, would result in a loud implosive sound.

Were it to occur in cases where the interior pressure were higher than the atmospheric, as in cases where the product were packed under pressure or developed pressure after being packaged, the pivotable section 60 would be spontaneously bent upwardly as the gas within the container rushed out with a loud explosive sound. These undesired effects do not occur with the instant construction, since the initial opening tear is limited to the area of the curved score portion 50.

Another advantage of the present invention is that the flatweb portion 38 of the tab 32 covers the curved portion 50 of the score 48 so that when the present end is used in a can wherein a granular or powdery product is under pressure, the product will not be sprayed onto the user by the outrush of gas when the curved portion 50 is ruptured in the initial state of the opening operation.

After the tab 32 has been rocked far enough to initiate rupture of the curved portion 50 of the score 48, continued upward rocking movement of the tab 32 causes the tear to progress outwardly in opposite directions along the straight segments 52 and 54 of the ancillary score 48, thus freeing the major portion of the inner edge of inner portion 64 of the pivotable section 60. Tearing of the metal in the segments 52, 54, is facilitated by the position of these segments diametrically of the rivet 40. However, the curved score segments 56, 58, effectively inhibit tearing beyond the ends of the segments 52, 54.

Further upward movement of the tab handle 34 brings the tab nose 36 into pressure engagement against the outer pivotable portion of section 60, with the outer edge of the nose positioned just above or inwardly of the score 30, and thus initiates rupture of the peripheral score 30, and continued rocking of the opening tab 32 forward until it touches the end seam 20 as shown in FIGS. 5 and 6, forces the outer pivotable portion of section 60 out of the original horizontal plane of the removable panel 31 and causes the tear in the peripheral score 30 to extend laterally in opposite directions, thereby creating a free edge 66 at the outer edge of the section 60. As it is thus rocked, the outer portion of section 60 moves from a horizontal (see FIG. 4) to an inclined (see FIG. 6) position.

Because of the flexing effect provided by the scores 62, the outer and inner portions of section 60 generally pivot around and bend along the scores 62, which remain substantially in the original plane of the removable panel 31. As a result, that outer portion of the pivotable section 60 which is located outwardly of the scores 62 pivots downwardly into the can, while that inner portion 64 between the scores 62 and the torn ancillary score 48 pivots upwardly. The twisting of the metal necessary to effect this latter pivoting action takes place primarily in the narrow portions 64 disposed between the flex-inducing scores 62 and the ancillary score 48. However, during the latter portion of the opening operation the outer pivotable portion of section 60 bends sharply along the scores 62, thus to some extent relieving the torsional stresses in the portion 64 and thus facilitating the twisting of the metal therein. When the tab reaches the position of FIGS. 5 and 6, the ends of the tear in the peripheral score 30 are in approximate chordal alinement with the flex-inducing scores 62, as seen in FIG. 5.

The contour which is assumed in the pivotal section 60 when the tab 32 is rocked forward, after rupture of the ancillary score 48, is shown in FIGS. 7 and 8. FIG. 7 shows the contour at the section line 7—7 which passes between the opening tab 32 and the end of the rupture in the straight segment 52 of the ancillary score 48. At this location, the narrow inner portion 64 is pivoted upwardly so that the rear free edge thereof created by the rupture of the straight segment 52 is raised above the plane of the removable section 31.

At locations farther from the opening tab 32 than the end of the rupture in the straight segments 52 and 54, there is no free edge which permits an upward displacement of metal and therefore the portion of the removable section behind the ancellary score remains substantially in the plane of the removable section 31. FIG. 8 shows the contour of the pivotable section 60 at such a location where substantially all of the bending occurs at the flex-inducing score 62, so that the metal on either side of that score is essentially planar.

It has been found that in the absence of the flex-inducing scores 62, the forward rocking of the opening tab has a tendency to cause one or both ends of the tear in the ancillary score 48 to break out of the score 48 and progress forwardly across the adjacent portion of the pivotable section 60 to the score line 30 at its free edge 66, and thereby cause at least one end of the section 60 to break away from the remainder of the removable panel 31, thus preventing proper opening of the can. It is thought that this breaking occurs because the metal in the pivotable section 60 tends to maintain a more or less planar configuration, while the tab is being rocked to the position of FIGS. 5 and 6, because of the rigidity of the pivotable section 60 when the scores 62 are not available to induce flexing therein. It is this rigidity of the section 60 which transmits the rocking force directly to the ends of the tear in the ancillary score 48 and causes at least one end of the tear to move out of the score and progress forwardly across the section 60. In some cases, a partial tearing of this nature might occur while the tab was being rocked forwardly, the tearing being completed during the subsequent state of the opening operation which is shown in FIG. 9 and is hereinafter described.

The flex-inducing scores 62 provide further insurance against a disabling breaking of one end of the pivotable section 60, since if, in spite of their above-described flex inducing action, improper manipulation of the opening tab 32 does cause one or both ends of the tear in the ancillary score 48 to break out of the score 48, the tear will progress only until it meets one of the scores 62, whereupon the tear will be stopped before it reaches the free edge 66.

After the tab has been rocked forwardly to the position of FIGS. 5 and 6, the final step in the opening operation is an upward and backward pull on the opening tab (in the general direction of the arrow in FIG. 9), to cause the tear in the peripheral score 30 to continue to extend in both directions around that score for 360° to completely detach the removable section 31 from the can end 10, thus completing the opening of the can.

It is [though] *thought* that the invention and many of its attendant advantages will be understood from the foregoing description and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. A component for a container, comprising:
a substantially flat wall;
a peripheral score in said wall defining a removable panel;
an opening tab;
a securement securing said opening tab to said panel;
said opening tab having an upturned nose portion at one end adjacent to said peripheral score and a handle portion at the other end thereof;
an ancillary score passing behind said securement and extending laterally therefrom to set off a pivotable section in said removable panel;
a substantially linear flex-inducing score positioned between said ancillary score and said peripheral score and defining therewith, respectively, inner and outer portions in said pivotable section;
whereby when said tab is rocked forwardly toward said peripheral score, said ancillary score is ruptured adjacent said securement thereby flexing said inner portion upwardly;
*and* further *rocking* [the container component of claim 1 including:] of said tab forces said tab nose portion downwardly to initiate rupture of said peripheral score to form a free edge on said outer portion of the pivotable section; and
said flex-inducing score with said tab nose portion causing a bend to occur in said outer portion, and, wherein said flex-inducing score prevents tears in said ancillary score from progressing forwardly across said pivoted section to said free edge.

2. The container component of claim 1 including:
a second flex-inducing score positioned in said pivotable section; and
with one of said flex-inducing scores disposed on either side of said securement.

3. The container component of claim 1 wherein said tab is provided with a central substantially flat-web portion between said nose and handle portions thereof, and wherein the juncture between said tab nose and central portions is disposed substantially adjacent said flex-inducing score to facilitate bending of said pivotable panel section thereat.

4. The container component of claim 2 wherein said flex-inducing scores are disposed in a straight line and extend outwardly on either side of said opening tab.

5. The container component defined in claim 12 wherein said ancillary score comprises a curved portion encircling said rivet closely for a portion of its circumference on the side thereof farthest from said peripheral score and two segments extending outwardly from the ends of said curved portion.

6. The container component defined in claim 5 wherein said tab has a central flat web portion overlying said ancillary score curved portion.

7. The container component defined in claim 5 wherein said segments are substantially straight and are disposed substantially along the centerline of said rivet.

8. The container component defined in claim 7 wherein said ancillary score further comprises two curled portions, one on each end of said straight segments, said curled portions each extending outwardly from said straight portions and away from said peripheral score.

9. The container component defined in claim 1 wherein said flex-inducing score is disposed in spaced relation to said ancillary score.

10. The container component defined in claim 1 wherein said flex-inducing score extends along a line disposed substantially normal to a line extending between said tab nose portion and said securement, thereby to cause said bend upon opening to occur along a line substantially coincident with said flex-inducing score line.

*11. A component for a container, comprising:*

*a substantially flat wall;*

*a peripheral score in said wall defining a removable panel;*

*a substantially rigid opening tab;*

*a securement securing said opening tab to said panel;*

*said opening tab having an elevated nose portion at one end adjacent to said peripheral score and a handle portion at the other end thereof;*

*said nose portion having its terminal surface disposed substantially above the lower surface of a major portion of said opening tab adjacent said panel, and,*

*said nose portion being spaced substantially above said panel,*

*an ancillary score passing behind said securement and extending laterally therefrom to set off a pivotable section in said removable panel;*

*whereby when said tab is initially rocked forwardly toward said peripheral score, said ancillary score is ruptured adjacent said securement thereby flexing the inner portion of the pivotable section upwardly;*

*and continued further rocking of said tab forces said elevated tab nose portion downwardly to initiate rupture of said peripheral score to form a free edge on the outer portion of the pivotable section; and*

*said tab nose portion causing a bend to occur in said panel outer portion.*

*12. The container component of claim 1 wherein said securement is a rivet.*

*13. The container component defined in claim 12 wherein said securement is a rivet.*

*14. The container component defined in claim 13 wherein said ancillary score comprises a curved portion encircling said rivet closely for a portion of its circumference on the side thereof farthest from said peripheral score and two segments extending from the ends of said curved portion.*

*15. The container component defined in claim 14 wherein said tab has a central flat web portion overlying said ancillary score curved portion.*

*16. The container component defined in claim 14 wherein said segments are substantially straight and are disposed substantially along the center line of said rivet.*

*17. The container component defined in claim 16 wherein said ancillary score further comprises two curled portions, one on each end of said straight segments, said curled portions each extending outwardly from said straight portions and away from said peripheral score.*

References Cited

The following references, cited by the Examiner, are of record in the patented file of this patent or the original patent.

UNITED STATES PATENTS

| | | | |
|---|---|---|---|
| 3,432,068 | 3/1969 | Fraze et al. | 220—54 |
| 3,404,800 | 10/1968 | Arfert | 220—54 |
| 3,404,801 | 10/1968 | Silver | 220—54 |
| 3,416,699 | 12/1968 | Bozek | 220—54 |
| 3,432,068 | 3/1969 | Fraze et al. | 220—54 |

GEORGE T. HALL, Primary Examiner

UNITED STATES PATENT AND TRADEMARK OFFICE

CERTIFICATE OF CORRECTION

PATENT NO. : Re. 27,897

DATED : Jan. 22, 1974

INVENTOR(S) : Leonard Thomas LaCroce, Raymond Luscombe Batchelar, John Wilson Rouse It is certified that error appears in the above-identified patent and that said Letters Patent are hereby corrected as shown below:

Claim 13 is corrected to read (in script letters) as follows:

13. The container component defined in claim 11 wherein said securement is a rivet Signed and Sealed this

*Twenty-seventh* Day of *June 1978*

[SEAL]

*Attest:*

RUTH C. MASON
*Attesting Officer*

DONALD W. BANNER
*Commissioner of Patents and Trademarks*